2,708,634

PROCESS FOR PREPARING STABILIZED PEANUT BUTTER

Walter M. Cochran, Highland Park, and John Carter, Chicago, Ill., assignors to The Glidden Company, Cleveland, Ohio, a corporation of Ohio No Drawing. Application September 12, 1952, Serial No. 309,373

3 Claims. (Cl. 99—128)

This invention relates to a novel process for preparing peanut butter characterized particularly by improved flavor and by stability against oil separation.

The preparation of peanut butter which is more or less stabilized against oil separation is described in numerous U. S. Patents (1,926,369, 2,068,051, 2,504,620, 2,521,243, 2,552,925, 2,562,630 and others). To the best of our knowledge the prior art has uniformly used dry-roasted peanuts for preparing peanut butter, and has subsequently modified the ground nut product to impart stability against separation of the oil therefrom. We have now discovered that when blanched peanuts are roasted in peanut oil which has previously been hydrogenated to a predetermined range of iodine value, then the roasted nuts can be ground directly into peanut butter of the desired smoothness, and such butter will exhibit remarkable and highly satisfactory stability against oil separation. Such treatment, in our opinions, also improves the flavor of the resulting peanut butter.

Accordingly, it is an object of this invention to prepare peanut butter from oil-roasted, blanched peanuts.

It is a further object to impart stability against oil separation to peanut butter by roasting blanched peanuts in hydrogenated peanut oil of predetermined iodine value or melting point.

These and other objects will be apparent from the following description of our invention.

As mentioned briefly above, we have discovered that in the preparation of peanut butter it is beneficial in several respects to roast the blanched nuts in oil, and that it is particularly beneficial to roast them in peanut oil which has been hydrogenated to a predetermined melting point. We have discovered that when the nuts are roasted in hydrogenated peanut oil having an iodine value between about 40 and 60, their flavor and that of peanut butter made from them is improved and that the roasted nuts, after being drained of most of the adhering oil, can be directly ground to butter without employing any further expedients to stabilize the butter against separation of oil on prolonged standing. The plasticity or spreadability of the butter has also been found to be satisfactory, although this property, of course, varies somewhat with the fineness and smoothness to which the butter has been ground.

We have ascertained that when blanched peanuts are roasted in hydrogenated peanut oil having an iodine value in the range indicated above, the nuts normally lose moisture in an amount of about 4% of their original weight, and normally lose a small amount of natural peanut oil to the roasting oil. We have found, however, that such losses are almost entirely offset by take-up of hydrogenated roasting oil which has penetrated and otherwise been absorbed and retained by the nuts. Thus the weight of the oil-roasted nuts is substantially the same as that of the original nuts. The amount of roasting oil so introduced into the roasted nuts varies somewhat with the species and geographical origin of the nuts so that some batches of nuts take up less or more oil than the average, i. e., from about 3.5% up to 4.5% by weight of the nuts. When such variations are encountered, we have found it beneficial to use a roasting oil of lower-than-average iodine value with nuts which absorb and retain lower-than-average amounts of roasting oil, and to use a roasting oil of higher-than-average iodine value with nuts which retain higher-than-average amounts of roasting oil. For example, if the absorption amounts to only about 3.5% then a roasting oil having an iodine value of about 40 will be needed. If the absorption is as much as 4.5%, then the iodine value of the roasting oil can be about 60. These values can be expressed by the formula

I. $V. = 50 - 20(4 - A) = 20A - 30$ wherein I. V. represents the iodine value of the roasting oil which should be used where the absorption of roasting oil, expressed in percentage, is A and varies between about 3.5% and 4.5% by weight of the nuts. Thus when the absorption is 3.5%, the roasting oil should have an iodine value around: $(20 \times 3.5) - 30 = 40$. When adjustment of the treatment is made on the basis of these principles, the stability of the resulting butters against separation of oil is apt to meet the average requirements, it being understood that stability requirements are not standardized and hence may vary considerably with different individuals or manufacturers.

After the nuts have been roasted, they are drained of oil and cooled somewhat, and then are ground in conventional grinding equipment to the desired fineness. Prior to the last stages of grinding, however, it is desirable to bring the partially ground butter (if not already sufficiently hot from the friction of previous grinding stages) to a temperature of about 140–160° F. to ensure complete melting and solution of the mixture of fats contained therein. The partially-ground butter is then salted (if desired) and then the grinding is completed. The butter can then be packed directly into suitable containers, where it is allowed to cool naturally.

The following examples illustrate the principles of our invention and represent the best modes now known for applying those principles. A control example illustrating dry-roasting is included for comparison.

*Example I.—Control*

Two pounds of blanched Spanish peanuts were dry-roasted in an oven at 350° F. to a dark straw brown color, and then were cooled. The roasted nuts were then ground in a meat-grinding unit of a Hobart mixer, after which the coarse product was heated to 140° F., and 1% of salt was added. The heated product was further ground to a smooth butter in a Waring Blendor. The resulting peanut butter was packed directly into glass jars, and thereafter stored at a temperature of about 75° F.

*Example II*

Two pounds of blanched Spanish peanuts from the same lot as used in Example I were roasted at 350° F. to a dark straw brown color in a bath composed of 92% hydrogenated peanut oil having an iodine value of 50 (melting point about 115° F.) and 8% peanut stearine, and then were drained and cooled. The oil-roasted nuts were next ground in the same equipment and in the same manner as described in Example I. The resulting butter was packed in glass jars and stored at about 75° F.

After 6 days' storage, the peanut butter of Example I had considerable free oil on its surface, while the butter of Example II remained dry. After 3 months the butter of Example II was still free of oil separation and had a good plastic consistency.

The addition of peanut stearine (fully hydrogenated peanut oil) to a partially hydrogenated peanut oil, as illustrated in Example II, represents a convenient manner of lowering the iodine value of a stock roasting oil so as to secure a roasting oil suited to the absorption (total take-up) of the particular nuts being roasted. Of course, if the stock oil were found to have too low an iodine value for a certain lot of nuts, then a small amount of unhydrogenated peanut oil could be added.

It should be recognized that if the absorption of roasting oil is below a desired value for a particular roasting oil which is being used, the absorption can be increased by crushing subsequent batches of nuts to rather coarse particles, thereby increasing the surface exposed to the roasting oil.

Having described our invention, what we claim is:

1. A method of preparing peanut butter which is stabilized against the separation of the oil content during prolonged standing, which comprises, roasting blanched peanuts in the presence of hydrogenated peanut oil having an iodine value between about 40 to 60; draining the nuts and thereafter grinding the roasted nuts into peanut butter.

2. The method as claimed in claim 1 wherein the hydrogenated peanut oil has an iodine value corresponding to the expression I. V.$=20A-30$, where A represents absorption of roasting oil in percent, and has a value between about 3.5 and 4.5%.

3. The process for roasting peanuts to adapt them for grinding into peanut butter, which comprises; roasting blanched peanuts in the presence of hydrogenated peanut oil having an iodine value between about 40–60.

References Cited in the file of this patent

UNITED STATES PATENTS

| | | |
|---|---|---|
| 1,476,649 | Schad | Dec. 4, 1923 |
| 2,302,574 | Richardson et al. | Nov. 17, 1942 |

OTHER REFERENCES

Oil and Soap, July 1944, page 199.